US012652236B2

(12) United States Patent
Khosrowpour et al.

(10) Patent No.: US 12,652,236 B2
(45) Date of Patent: Jun. 9, 2026

(54) NETWORK QUALITY OF SERVICE BASED ON APPLICATION CONTEXT

(71) Applicant: DELL PRODUCTS L.P., Round Rock, TX (US)

(72) Inventors: Farzad Khosrowpour, Pflugerville, TX (US); Balasingh Samuel, Hutto, TX (US); Mitchell Markow, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 55 days.

(21) Appl. No.: 18/604,685

(22) Filed: Mar. 14, 2024

(65) Prior Publication Data

US 2025/0293971 A1     Sep. 18, 2025

(51) Int. Cl.
H04L 45/28 (2022.01)
H04L 45/02 (2022.01)
H04L 45/76 (2022.01)

(52) U.S. Cl.
CPC .............. H04L 45/28 (2013.01); H04L 45/02 (2013.01); H04L 45/76 (2022.05)

(58) Field of Classification Search
CPC ......... H04L 45/28; H04L 45/22; H04L 45/02; H04L 45/76
See application file for complete search history.

(56) References Cited

U.S. PATENT DOCUMENTS

| | | | | |
|---|---|---|---|---|
| 9,602,334 | B2 * | 3/2017 | Benny | H04L 12/4641 |
| 11,509,587 | B2 | 11/2022 | Narula et al. | |
| 11,882,004 | B1 | 1/2024 | Sethi et al. | |
| 12,007,865 | B2 * | 6/2024 | Kommula | H04L 41/16 |
| 12,221,880 | B2 * | 2/2025 | Mason | E21B 47/16 |
| 2015/0333953 | A1 * | 11/2015 | Vasseur | H04L 45/22 |
| | | | | 370/228 |
| 2020/0162371 | A1 * | 5/2020 | Musku | H04L 45/04 |
| 2022/0237061 | A1 * | 7/2022 | Sethi | G06F 11/3065 |

OTHER PUBLICATIONS

Fang, C., et al. "Experiments with Energy Saving Dynamic Source Routing." University of California San Diego, Oct. 2013, cseweb. ucsd.edu/~jlbradle/fang-huang-steck-report.pdf. (Year: 2013).*

* cited by examiner

*Primary Examiner* — Chirag R Patel
(74) *Attorney, Agent, or Firm* — Larson Newman, LLP

(57) ABSTRACT

An information handling system stores telemetry data for the information handling system. A processor collects the telemetry data and determines a target application associated with the telemetry data. The processor sets a quality of service for the target application based on a context of the target application. The processor determines whether a first network path or a failover network path associated with the target application is a preferred network path. In response to the first network path being the preferred network path, the processor provides the telemetry data from the target application over the first network path. In response to the failover network path being the preferred network path, the processors failover the target application to the failover network path. The telemetry data is provided based on the quality of service.

20 Claims, 4 Drawing Sheets

100

400

NETWORK QUALITY OF SERVICE BASED ON APPLICATION CONTEXT

FIELD OF THE DISCLOSURE

The present disclosure generally relates to information handling systems, and more particularly relates to a network quality of service based on an application context.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system may store telemetry data for the information handling system. A processor collect the telemetry data and determine a target application associated with the telemetry data. The processor may set a quality of service for the target application based on a context of the target application. The processor may determine whether a first network path or a failover network path associated with the target application is a preferred network path. In response to the first network path being the preferred network path, the processor may provide the telemetry data from the target application over the first network path. In response to the failover network path being the preferred network path, the processor may failover the target application to the failover network path. The telemetry data may be provided based on the quality of service.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
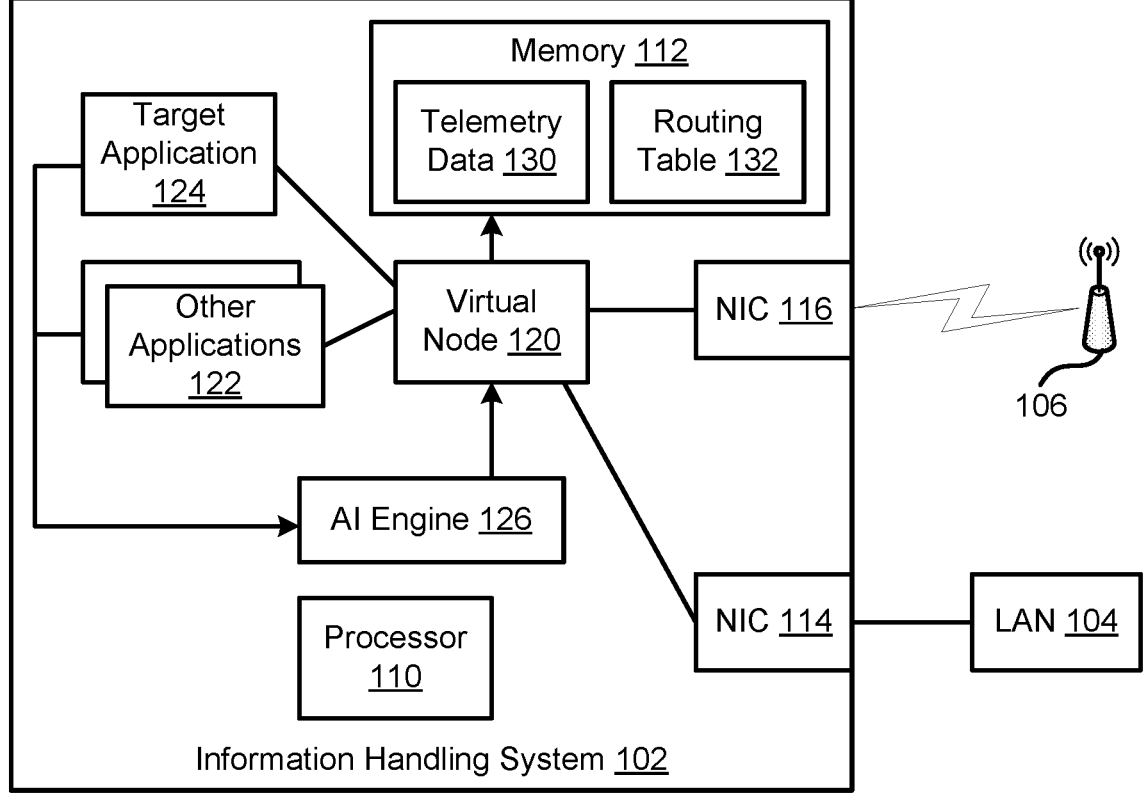
FIG. 1 is a block diagram of a portion of a system including an information handling system, a wide area network access point, and a local area network access point according to at least one embodiment of the present disclosure.

FIG. 1 illustrates a system 100 including an information handling system 102, a local area network (LAN) access point 104, and wireless wide area network (WAN) access point 106 according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 102 includes a processor 110, a memory 112, network interface cards (NICs) 114 and 116. Processor 110 may execute any suitable application or service to perform the operations described herein. For example, processor 110 may execute a virtual node 120, applications 122 and 124, and an artificial intelligence (AI) engine 126. Memory 112 may store any suitable data associated with information handling system 102 such as telemetry data 130. Information handling system 102 may include any additional components without varying from the scope of this disclosure.

During operation of information handling system 102, applications 122 and 124 may utilize a variety of resources within the information handling system including, but not limited to, network resources. In an example, the network resources may be any suitable resources, such as virtual node 120, NICs 114 and 116, or the like. In previous information handling systems, the priority and usage of all application resources may not be coordinated based on a target or focused applications. Additionally, the network layer may provide the "fastest" and "highest performance" path to an application based the observations at the network layer. However, when previous information handling systems provide network paths to applications based on these criteria, the network paths may contradict the need to prioritize the network traffic for a target application in the system context. In previous information handling systems, determining the network path without prioritizing the network traffic for the target application may result in poor user experience.

In certain examples, if the information handling system is a workstation, different batches of workloads may be scheduled at different times, such as at nighttime. In these situations, all information handling systems within a particular cluster may rely heavily on the same network interconnect, such that it may be critical to reduce the latency of the network interconnect. In previous information handling systems, the workloads may get scheduled and there is less sensitivity to power and noise problems but latency improvement becomes more critical. Information handling system 102 and network priority of applications 122 and 124 may be improved by processor 110 executing virtual node 120 and AI engine 126 to manage the network traffic as a function of system resources. In an example, system resources may be used based on user intent or preferences for utilization, power, performance, fan noise, or the like.

During operation of information handling system 102, processor 110 may perform any suitable operations to manage network traffic from applications 112 and 124 to other information handling systems via NICs 114 and 116 and respective access points 104 and 106. For example, processor 110 may perform operations to set up the application context-based network quality of service (QoS) and operations to implement the application context-based QoS. In an example, processor 110 may utilize a virtual network interface to create virtual network node 120.

In certain examples, processor 110 may determine which of applications 122 and 124 access a network either through access point 104 or access point 106. In response to determining the applications 122 and 124 that access the network, processor 110 may create a list of these applications and store the list in memory 112. In an example, memory 112 may store a routing table 132 that virtual node 120 may utilize during the transmission of data from applications 122 and 124 to other information handling systems via NIC 114 or 116 and corresponding access point 104 or 106. In certain examples, upon being built, routing table 132 may be static and may be utilized to control a network route for a particular one of applications 122 and 124.

In an example, processor 110 may build or create new entries in routing table 132. Each different new entry may correspond to a different one of applications 122 and 124 that access the network. Processor 110 may then determine a target application, such as target application 124, that virtual node 120 may control or manage the associated network traffic from the target application. In response to identifying target application 124, processor 110 may bind the target application to virtual network node 120. In certain examples, processor 110 may bind virtual node 120 to NICs 114 and 116. The binding of virtual node 120 to both NICs 114 and 116 may create a failover for the virtual node. In an example, if one of NICs 114 and 116 fails, the failover binding may enable virtual node 120 to communicate across the network via the other NIC.

After processor 110 has set up virtual node 120 and bound target application 124 to the virtual node, the processor may execute a runtime operation of an application context-based network QoS. During runtime of information handling system 102, processor 110 may collect system telemetry data 130 and store the system telemetry data in memory 112. In an example, processor 110, via AI engine 126, may determine target application 124 to provide telemetry data 130 across the network. In certain examples, processor 110 may determine target application 124 via any suitable application context data. In an example, the application context data may include, but is not limited to, power, system health score performance, latency, acoustics, and other application attributes.

In certain examples, AI engine 126 may utilize the application context data to determine a current state of information handling system 102 and a current state of target application 124. Based on the current states of information handling system 102 and target application 124, processor 110, via AI engine 126, may create an overall QoS for network traffic from target application to other nodes of system 100. In an example, the QoS may include different priority settings for transferring data across the network. For example, the QoS, created by AI engine 126, may cause virtual node 120 to apply a lower priority to all network traffic from other applications 122. In this example, the QoS may cause virtual node 120 to keep the priority level for network traffic from target application at a default setting.

In an example, virtual node 120 may utilize the QoS determine a best network path for data from target application 124. For example, virtual node 120 may determine whether a currently assigned path of NIC 114 and access point 104, as assigned in routing table 132, is the best path. In certain examples, the best path may be determined based on any suitable QoS settings. For example, the QoS setting may be to determine the best performance/power usage network path.

If virtual node 120 determines that the currently assigned path is the best performance/power usage network path, the virtual node may continue to provide data from target application to other information handling systems or node over the currently assigned path. However, if the currently assigned path is not the best performance/power usage network path, processor 110 may perform one or more different operations to affect or change how data is transferred across the network. In an example, processor 110 may encapsulate a QoS setting in network layers 1 and 3 to achieve the best performance for target application 124. For example, processor 110 may tag fields in network layers 1 and 3 for network priority settings. In certain examples, the fields in network layers 1 and 3 may be EP, class selector, and assured forward fields. In an example, the tags in the network layer fields may provide routing and other data traffic control hints for access points 104 and 106, as well as other devices on the network. These operations by processor 110 may improve data transmission for target application 124 with respect to network layers IP addressing, host-to-host communications, packet formatting, fragmentation, or the like.

In an example, processor 110, via virtual node 120, may determine whether a failover path through NIC 116 and access point 106 is a more efficient path. In certain examples, processor 110, via virtual node 120, may utilize key performance indicators (KPIs) characterize the network settings by performance/watt and total efficiency attributes of the network paths. If the failover path is more efficient, virtual node 120 may being transferring data from target application 124 to other information handling systems via the failover path of NIC 116 and access 106. After switching the data traffic for target application 124 to the failover path, processor 110 may continuously monitor the state of information handling system 102 and the state of the target application. In an example, if the state of information handling system 102 and the state of target application 124 remains the substantially the same, processor 110, via virtual node 120, may determine whether the failover path or the original path is the most efficient. Based on this determination, virtual node 120 may utilize the most efficient path to transfer the data from target application 124.

If the state of information handling system 102 or the state of target application 124 has changed, processor 110, via virtual node 120, may determine a new target application as described above. Based on this determination, virtual node 120 may utilize the most efficient path to transfer the data from target application 124. After selecting a new target application, processor 110 perform one or more of the operations described above to ensure optimal performance and the best QoS setting for the target application over the network. In an example, processor 110 may apply the tagging and QoS settings for network traffic implementing both IPV4 and IPV6.

In certain examples, information handling system 102 may be connected to the network via any suitable number of routing maps. As used herein, routing maps may refer to different routes in a network, such as different access points, edge devices, or the like, to transfer data from target application 124 to an identified end-point information handling system. In an example, processor 110 may utilize telemetry data 130 to create a virtual network map table, such as Table 1 below, for each application 122 and 124 in information handling system 102.

TABLE 1

| Virtual Network Path Index | Routing Map | Criteria | Priority |
|---|---|---|---|
| 1 | Map 1 | Best Performance/Watt | 1 |
| 2 | Map 2 | Power Conserve | 5 |
| 3 | Map 3 | Best Reliability | 4 |
| 4 | Map 3 | Best Efficiency | 3 |
| 5 | Map 4 | Best Carbon Efficiency | 6 |
| 6 | Map 1 | Best Latency | 2 |

As shown in Table 1, each routing map, or route, may have a criteria or KPI and priority level. In an example, the possible criteria for a route map may include, but are not limited to, best performance/power usage, power conservation, best reliability, best efficiency, best carbon efficiency, and best latency. In certain examples, system events or an information technology decision maker (ITDM) policy may set or change the priority order for the routing maps. In an example, system events may be any suitable conditions within information handling system 102, such as application/processor workloads, power usage, geographic location, or the like. The ITDM policy may be set by a user of information handling system 102 to indicate which criteria the user values the most. The term "user" in this context should be understood to encompass, by way of example and without limitation, a user device, a person utilizing or otherwise associated with the device, or a combination of both. An operation described herein as being performed by a user may therefore be performed by a user device, or by a combination of both the person and the device.

Based on the information or data in the virtual network map table represented by Table 1, virtual node 120 may dynamically choose the virtual network path that is best suited for target application 102 at any given point. In an example, virtual node 126 may set all other non-target applications 122 to a default priority map, such as to the lowest priority map. Virtual node 120 may also utilize a different policy for other non-target applications 122 without varying from the scope of this disclosure.

Figure 2:
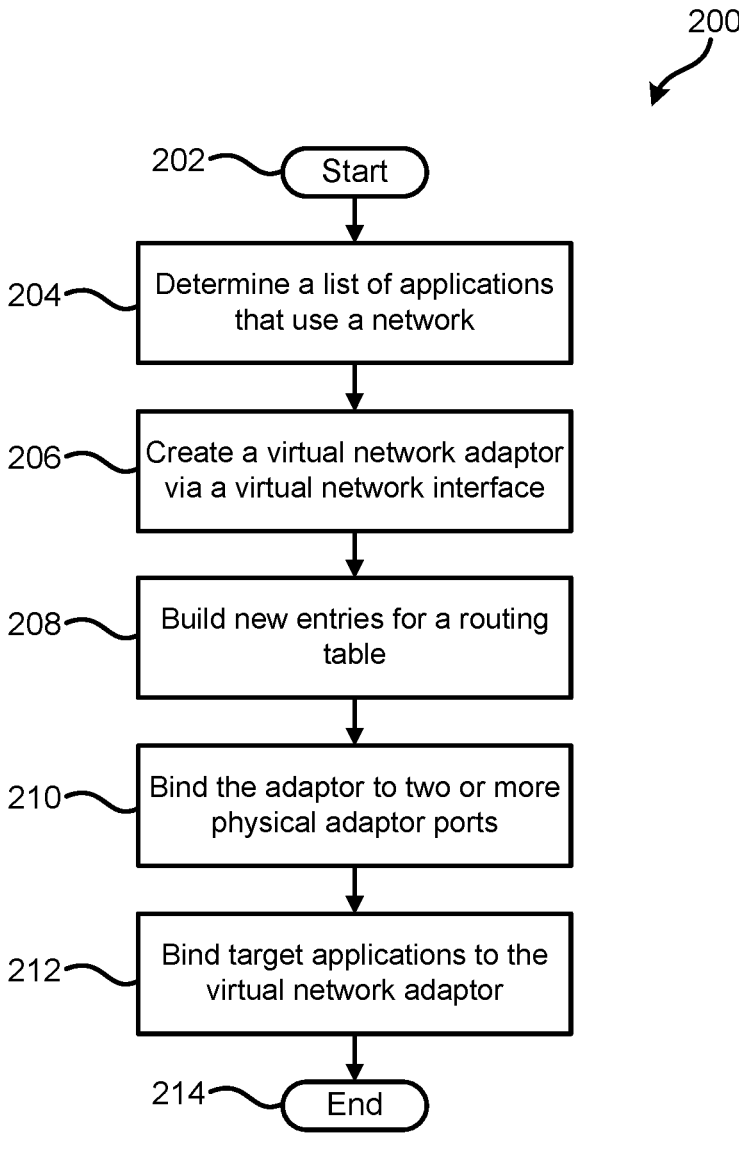
FIG. 2 is a flow diagram of a method for establishing an application context-based network quality of service according to at least one embodiment of the present disclosure.

FIG. 2 is a flow diagram of a method 200 for setting up an application context-based network quality of service according to at least one embodiment of the present disclosure, starting at block 202. It will be readily appreciated that not every method step set forth in this flow diagram is always necessary, and that certain steps of the methods may be combined, performed simultaneously, in a different order, or perhaps omitted, without varying from the scope of the disclosure. FIG. 2 may be employed in whole, or in part, processor 110, virtual node 118, or virtual node 118 of information handling system 102 in FIG. 1, or any other type of controller, device, module, processor, or any combination thereof, operable to employ all, or portions of, the method of FIG. 2.

At block 204, a list of applications that utilize a network is determined. In an example, the list of applications may include any suitable applications that communicate with other devices to transfer data or other information about the information handling system or the other information handling system. For example, the data may include telemetry data, sensor data, data stored in a memory, or the like. At block 206, a virtual network adaptor or node is created via a virtual network interface. In certain examples, the virtual network adaptor or node may be created to implement data transfers in accordance with a routing table, tagging, QoS settings, or the like.

At block 208, new entries for a routing table are built. In an example, the new entries may be associated with the applications and priority levels for the identified applications. For example, each new entry may be associated with a different identified application. At block 210, the adaptor is bound to two or more physical adaptor ports. In an example, binding the virtual network adaptor or node to two or more physical ports may provide multiple network paths for the applications. These network paths may be assigned as a primary network path and one or more failover paths. At block 212, target applications are bound to the virtual network adaptor, and the flow ends at block 214. In certain examples, the target application may be bound to the virtual network node so that the virtual node may perform one or more operations to prioritize network traffic based on the context of the target application.

Figure 3:
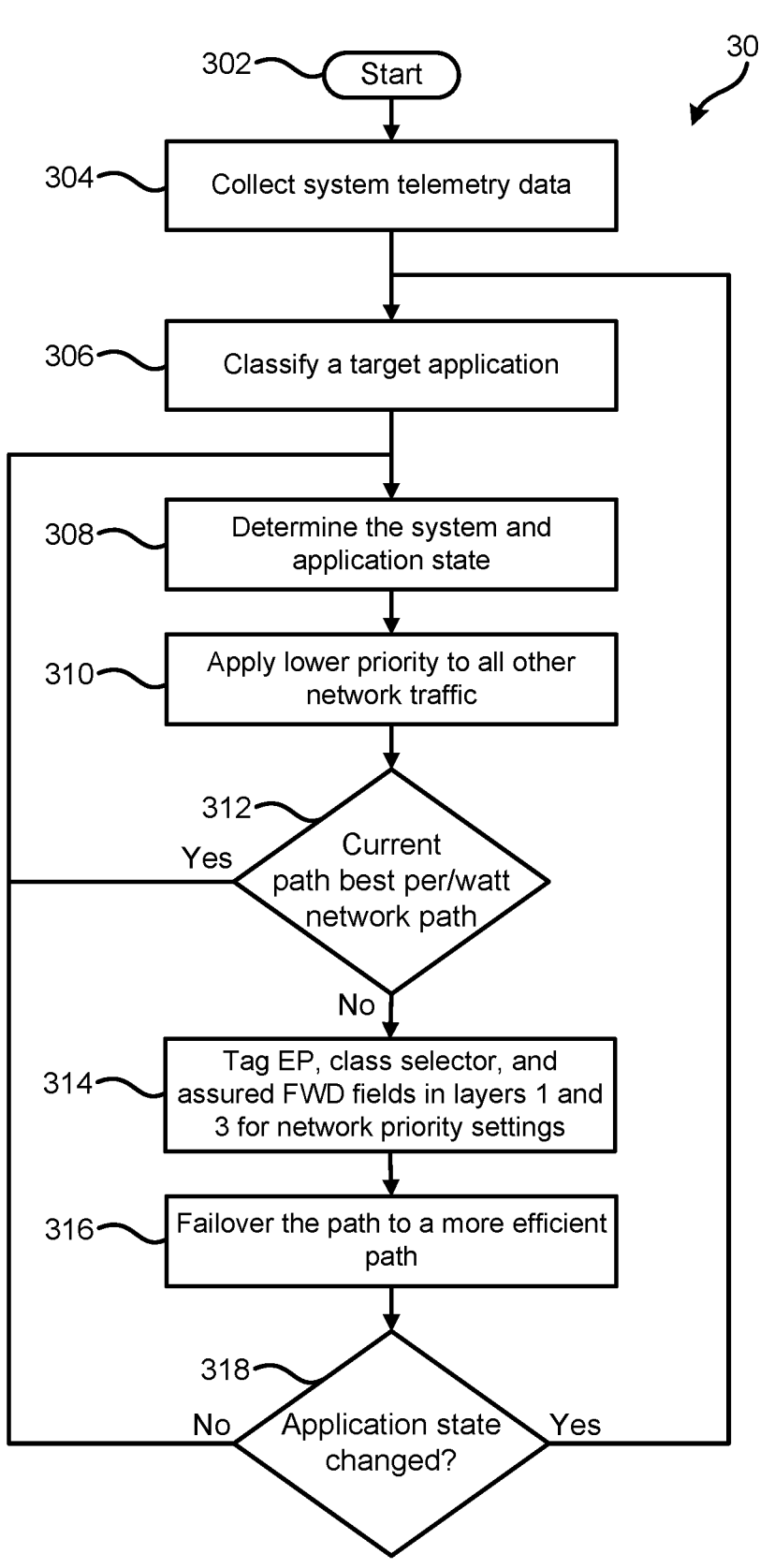
FIG. 3 is a flow diagram of a method for managing traffic utilizing an application context-based network quality of service according to at least one embodiment of the present disclosure.

FIG. 3 is a flow diagram of a method 300 for managing traffic utilizing an application context-based network quality of service according to at least one embodiment of the present disclosure, starting at block 302. It will be readily appreciated that not every method step set forth in this flow diagram is always necessary, and that certain steps of the methods may be combined, performed simultaneously, in a different order, or perhaps omitted, without varying from the scope of the disclosure. FIG. 3 may be employed in whole, or in part, processor 110, virtual node 118, or virtual node 118 of information handling system 102 in FIG. 1, or any other type of controller, device, module, processor, or any combination thereof, operable to employ all, or portions of, the method of FIG. 3.

At block 304, system telemetry data is collected. In an example, the telemetry data may be collected by any suitable application, such as a target application, within an information handling system. In certain examples, the telemetry data may be stored in a memory of the information handling system. At block 306, a target application is classified. The target application may be identified by the type of application, such as a telemetry service application, a data collection application, a data consumer application, or the like.

At block 308, the system and application states are determined. In an example, an AI engine may utilize the application context data to determine a current state of the information handling system and a current state of the target application. Based on the current states of information handling system 102 and target application 124, processor 110, via AI engine 126, may create an overall QoS for network traffic from target application to other nodes of system 100. In an example, the QoS may include different priority settings for transferring data across the network. For example, the QoS, created by AI engine 126, may cause virtual node 120 to apply a lower priority to all network traffic from other applications 122. In this example, the QoS may cause virtual node 120 to keep the priority level for network traffic from target application at a default setting.

At block 310, a lower priority is applied to all other network traffic. In an example, the other network traffic may be any data traffic associated with all applications other than the target application. At block 312, a determination is made whether a current path is the best performance/power usage network path. In certain examples, the determination of whether the current path is the best network path may be based on any suitable KPIs, such as best performance/power usage, power conservation, best reliability, best efficiency, and best carbon efficiency.

If the current path is the best performance/power usage network path, the flow continues as stated above at block 308. If the current path is not the best performance/power usage network path, fields in network layers 1 and 3 are tagged for network priority settings at block 314. In an example, the fields may be EP, class selector, and assured forward fields in network layers 1 and 3. The tags may be utilized for any suitable operations by the virtual network node or other nodes in the network, such as network layers IP addressing, host-to-host communications, packet formatting, fragmentation, or the like. Additionally, if the current path is the best performance/power usage network path, a QoS setting for the target application or data traffic from the target application may also be changed.

At block 316, the path is failover to a more efficient path. The failover path may be any other network path through a physical node bound to the virtual network adaptor or node. At block 318, a determination is made whether an application state has changed. If the application state has changed, the flow continues as stated above at block 306. If the application state has not changed, the flow continues as stated above at block 308.

Figure 4:
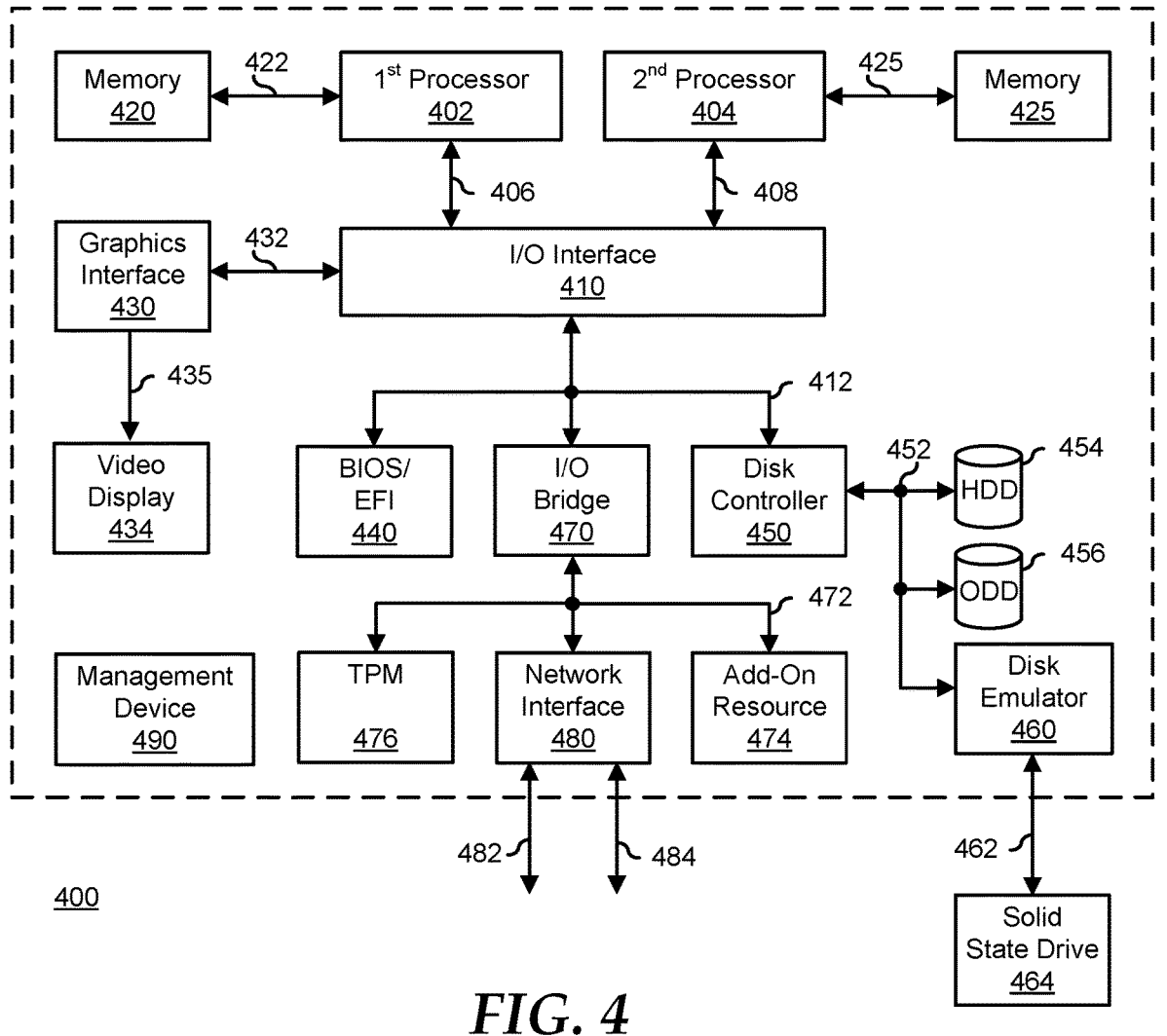
FIG. 4 is a block diagram of a general information handling system according to an embodiment of the present disclosure.

FIG. 4 shows a generalized embodiment of an information handling system 400 according to an embodiment of the present disclosure. Information handling system 400 may be substantially similar to information handling system 102 of FIG. 1. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below and operates to perform one or more of the methods described below. Information handling system 400 includes a processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an I/O bridge 470, one or more add-on resources 474, a trusted platform module (TPM) 476, a network interface 480, a management device 490, and a power supply 495. Processors 402 and 404, I/O interface 410, memory 420, graphics interface 430, BIOS/UEFI module 440, disk controller 450, HDD 454, ODD 456, disk emulator 460, SSD 462, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432 and provides a video display output 436 to a video display 434. In a particular embodiment, information handling system 400 includes separate memories that are dedicated to each of processors 402 and 404 via separate memory interfaces. An example of memories 420 and 430 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 4394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412 or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400.

Management device 490 can operate off of a separate power plane from the components of the host environment so that the management device receives power to manage information handling system 400 when the information handling system is otherwise shut down. An example of management device 490 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed, or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a memory to store telemetry data for the information handling system; and
a processor to communicate with the memory, the processor to:

collect the telemetry data;

determine a target application associated with the telemetry data;

set a quality of service for the target application based on a context of the target application;

determine whether a first network path or a failover network path associated with the target application is a preferred network path, wherein the preferred network path is determined based on performance and power usages and power conservation of the first network path and the failover network path;

in response to the first network path being the preferred network path, provide the telemetry data from the target application over the first network path; and in response to the failover network path being the preferred network path, fail over the target application to the failover network path, wherein the telemetry data is provided based on the quality of service.

2. The information handling system of claim 1, further comprising:

first and second physical network interface cards, wherein prior to the collection of the telemetry data, the processor further to:

create a virtual network node; and bind the virtual network node to both of the first and second network interface cards.

3. The information handling system of claim 2, wherein the processor further to:

identify one or more applications that utilize a network;

create entries in a routing table, wherein each different entry is associated with a different one of the applications; and store the routing table in the memory.

4. The information handling system of claim 1, wherein the processor further to: bind the target application to a virtual network node, wherein the virtual network node provides the telemetry data over either the first network path or the failover network path.

5. The information handling system of claim 1, wherein the processor further to: set a priority level of network traffic from other applications to a lower priority level as compared to network traffic from the target application.

6. The information handling system of claim 1, wherein the processor to: execute an artificial intelligence engine to determine the target application based on the context of the target application.

7. The information handling system of claim 1, wherein the context of the target application includes power, system health score performance, latency, acoustics, and other application attributes.

8. The information handling system of claim 1, wherein the processor to further determine the preferred network path based on first key performance indicators of the first network path and second key performance indicators of the failover network path.

9. A method comprising:

collecting, by a processor of an information handling system, telemetry data for the information handling system;

determining a target application associated with the telemetry data;

setting a quality of service for the target application based on a context of the target application;

if a first network path is a preferred network path compared to a failover network path associated with the target application, then providing, by the processor, the telemetry data from the target application over the first network path; and if the failover network path is the preferred network path, then failing over the target application to the failover network path, wherein the telemetry data is provided based on the quality of service, wherein the preferred network path is determined based on performance and power usages and power conservation of the first network path and the failover network path.

10. The method of claim 9, wherein prior to the collection of the telemetry data, the method further comprises:

creating a virtual network node; and binding the virtual network node to both of first and second network interface cards of the information handling system.

11. The method of claim 10, further comprising:

identifying one or more applications that utilize a network;

creating entries in a routing table, wherein each different entry is associated with a different one of the applications; and storing the routing table in the memory.

12. The method of claim 9, further comprising: binding the target application to a virtual network node, wherein the virtual network node provides the telemetry data over either the first network path or the failover network path.

13. The method of claim 9, further comprising: setting a priority level of network traffic from other applications to a lower priority level as compared to network traffic from the target application.

14. The method of claim 9, further comprising: executing an artificial intelligence engine to determine the target application based on the context of the target application.

15. The method of claim 9, wherein the context of the target application includes power, system health score performance, latency, acoustics, and other application attributes.

16. The method of claim 9, further comprising: determining the preferred network path further based on first key performance indicators of the first network path and second key performance indicators of the failover network path.

17. An information handling system comprising:

first and second physical network interface cards;

a memory to store telemetry data for the information handling system; and a processor to:

create a virtual network node; and bind the virtual network node to both of the first and second network interface cards;

collect the telemetry data;

determine a target application associated with the telemetry data;

set a quality of service for the target application based on a context of the target application;

based first key performance indicators of a first network path and second key performance indicators of a failover network path, determine whether the first network path or the failover network path associated with the target application is a preferred network path;

in response to the first network path being the preferred network path, provide the telemetry data from the target application over the first network path; and in response to the failover network path being the preferred network path, failover the target application to the failover network path, wherein the telemetry data is provided based on the quality of service, wherein the preferred network path is determined based on performance and power usages and power conservation of the first network path and the failover network path.

18. The information handling system of claim 17, wherein the processor further to:

identify one or more applications that utilize a network;

create entries in a routing table, wherein each different entry is associated with a different one of the applications; and store the routing table in the memory.

19. The information handling system of claim 17, wherein the processor further to: bind the target application to a virtual network node, wherein the virtual network node provides the telemetry data over either the first network path or the failover network path.

20. The remote compute device of claim 17, wherein the processor further to: set a priority level of network traffic from other applications to a lower priority level as compared to network traffic from the target application.

* * * * *